O. TUFTS.
Pile for Wrought Iron Shafts.
No. 14,210. Patented Feb. 5, 1856.
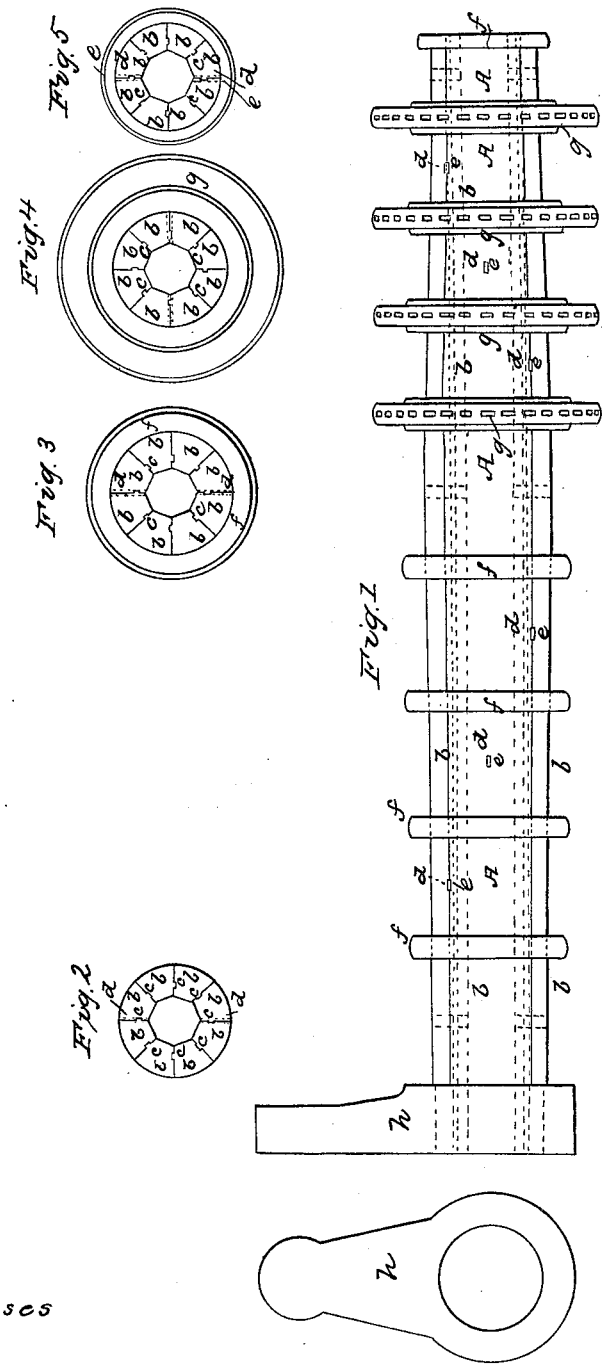

UNITED STATES PATENT OFFICE.

OTIS TUFTS, OF BOSTON, MASSACHUSETTS.

MAKING WROUGHT-IRON SHAFTS.

Specification of Letters Patent No. 14,210, dated February 5, 1856.

*To all whom it may concern:*

Be it known that I, OTIS TUFTS, of Boston, Suffolk county, Massachusetts, have invented a new and useful Improvement in Large Wrought-Iron Shafts for Steamboats and other Purposes Requiring Shafts of Great Strength; and I do hereby declare that the following description with the accompanying drawings forms a full, clear, and exact specification thereof.

There is a growing demand for large wrought iron shafts especially for propelling steamboats of great size. The nature of iron limits the size of which solid shafts can be thoroughly wrought under the forge hammer. The largest shafts now manufactured are seldom, if ever, of equal soundness, tenacity and strength throughout. They frequently break from flaws and defects which cannot be avoided in the present mode of constructing them solid. It is found impracticable to secure the requisite strength by increasing the size of a solid shaft; for beyond certain dimensions, more is lost by defects incident to large masses of wrought iron, than is gained by increase of size.

The object of my invention is, so to construct large wrought iron shafts, as with the smallest quantity of iron thoroughly wrought and free from flaws, to obtain the greatest strength of shaft. For this purpose I make my shaft of several longitudinal pieces of iron, separately wrought under the forge hammer, and fitted and locked and bound together substantially as herein described, the shaft being of large circumference, and more or less hollow. In heavy and powerful machinery large bearings are the best in all respects.

To enable others skilled in the art, to make and use my improvement, I describe its construction and operation reference being had to the accompanying drawings, as follows:

Figure 1 is a top view of my improved shaft, and Figs. 2, 3, 4, and 5 are cross sections of the same, taken through the red lines.

I construct my improved shaft (A) of such a number of separate pieces of wrought iron (*b*) as will make each piece, from its size, best adapted for the process of hammering, so as to be thereby the most strengthened, and rendered the freest from the defects before named incident to large solid shafts wrought in one piece. Six or eight pieces work well. I forge and hammer each piece separately. I plane each piece into the required shape. I tongue and groove each piece longitudinally, as shown in section at (*c*), for the purpose of interlocking the pieces together lengthwise. I also cut cross-grooves in the adjacent faces of the several pieces, as shown at (*d*) for the insertion of steel keys (*e*) to prevent any movement of the pieces among themselves lengthwise of the shaft. I fit and lock the pieces together with their longitudinal tongues and grooves and lateral keys, and then bind them with large wrought iron collars (*f*) which are to be fitted on hot, and shrunk by cooling. I also fit and shrink on, in the same way, the large hubs or center pieces (*g*) holding and carrying the paddle-wheel arms, so that said center pieces shall serve as powerful collars to bind together the shaft. These collars and hubs may be fitted on over the ends of the lateral keys, or some of them, to prevent their starting out. I also fit on hot, the large crank (*h*) and shrink it by cooling, so as to make that serve as a collar to bind the shaft. I make the above named parts of suitable size and shape to answer the requirements of the shaft in whatever use it is to be put to, whether in propelling large steamers, or heavy machinery. I thus obtain a wrought iron shaft, of any required strength for practical use, so constructed as to bear greater torsion and strain and be less liable to break from flaws than shafts constructed in any other way known to me.

I claim—

Constructing large wrought iron shafts, with pieces separately wrought and fastened together substantially as described.

OTIS TUFTS.

Witnesses:
J. GILES,
SAML. N. PIPER.